United States Patent [19]
Kiffmeyer et al.

[11] 3,753,246
[45] Aug. 14, 1973

[54] PRINTER ADAPTED FOR OPERATION WITH A PROGRAMMABLE CONTROLLER

[75] Inventors: William W. Kiffmeyer, Milwaukee; David J. Sackman, West Milwaukee, both of Wis.

[73] Assignee: Allen-Bradley Company, Milwaukee, Wis.

[22] Filed: Aug. 27, 1971

[21] Appl. No.: 175,624

[52] U.S. Cl. .............................................. 340/172.5
[51] Int. Cl. .......................................... G06k 15/02
[58] Field of Search .................................. 340/172.5

[56] References Cited
UNITED STATES PATENTS
3,436,732    4/1969    Charters ......................... 340/172.5

*Primary Examiner*—Paul J. Henon
*Assistant Examiner*—Paul R. Woods
*Attorney*—Barry E. Sammons et al.

[57] ABSTRACT

A printer is attached to a programmable controller to read and record the program stored in its memory. The clock pulse generator in the programmable controller is disabled and clock pulses are generated by a central controller in the printer. Each clock pulse reads an instruction from the controller memory which instruction is decoded by the printer to select symbols on a digital printer. The digital printer visually records the instruction in response to a print command signal from the central controller, after which another clock pulse is generated to read the next instruction from memory. A line number counter selects symbols which are recorded with each instruction to indicate its location in the memory and a symbol table and decoder circuit selects symbols which are recorded with each instruction to indicate the device acted upon by the instruction

4 Claims, 4 Drawing Figures

INVENTORS
WILLIAM W. KIFFMEYER
DAVID J. SACKMANN
BY Barry E. Sammons
ATTORNEY

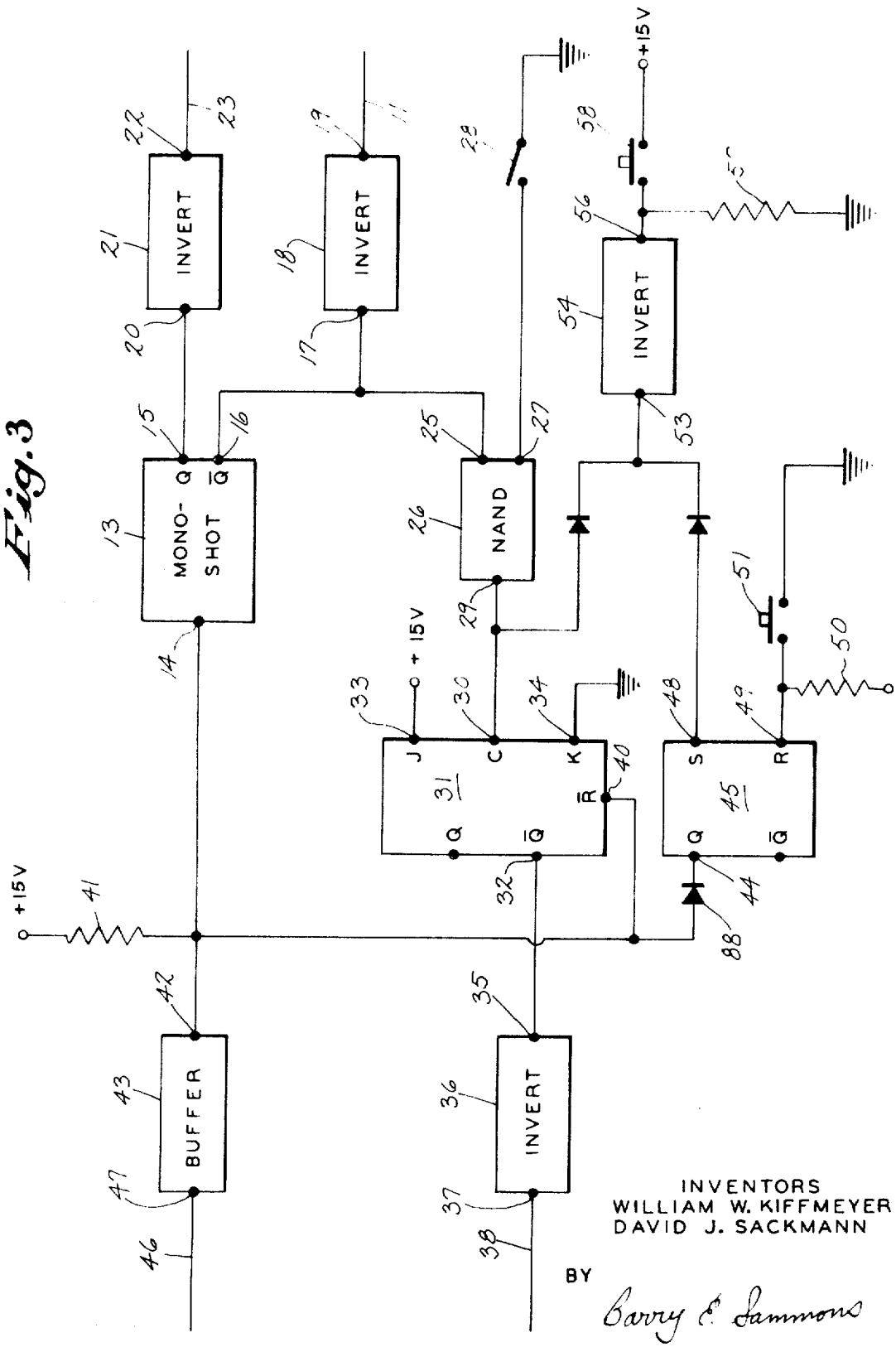

PRINTER ADAPTED FOR OPERATION WITH A PROGRAMMABLE CONTROLLER

BACKGROUND OF THE INVENTION

The field of the invention is electromechanical printers attached to read, decode and visually record programs stored in the memory of programmable controllers.

Controllers, such as that disclosed in the co-pending patent application Ser. No. 137,923 filed Apr. 27, 1971 and entitled "Programmable Matrix Controller", perform complex control jobs in accordance with a stored program. The program is comprised of a set of instructions which direct the controller to examine the condition of various input devices such as limit switches, push buttons, solenoids and photoelectric cells, compare these input conditions to the conditions specified in the program, and accordingly, direct the controller to energize or deenergize output devices. The programs are derived from either a "ladder diagram", a logic diagram, or a set of Boolean expressions which are converted into machine language and entered into the machine memory.

When the controller is subsequently operated, problems often arise which require that the program stored in the memory be altered. As a result, many changes are made on the job site and in order to provide a visual record of the finalized program, it is desirable to have a means of providing a printed record of the final program stored in the controller.

A number of available electromechanical printers have been adapted to read and record stored programs. These prior printers, however, must be used in conjunction with a computer or "mini-computer". Such systems are expensive, particularly when the user does not have a large number of controllers to justify its cost, or does not have access to computer services.

SUMMARY OF THE INVENTION

The present invention relates to a printer which is operable to read, decode and visually record stored programs without the necessity of expensive and complex digital computing circuitry. More specifically, the invented printer is intended for use with a programmable controller of the type having a memory matrix containing a program stored as a series of one word instructions, which instructions are read out, one at a time, in response to clock pulses produced by a clock pulse generator in the controller. The printer includes digital printer means adapted to record in response to a print command signal a line containing a plurality of selected symbols; decoder means connected to both the memory matrix of the programmable controller and the digital printer, and being adapted to receive each instruction read from the memory matrix and select symbols corresponding to the received instructions; switch means for disconnecting the clock pulse generator from the memory matrix; and a central controller connected to the digital printer and the programmable controller, the central controller being adapted to periodically generate a clock pulse to the programmable controller to read an instruction out of the memory matrix, and to generate a corresponding print command signal to activate the digital printer which visually records the selected symbols.

An object of the invention is to provide a printer for a programmable controller which does not require the use of complex, expensive digital computing circuitry. The invented circuit disables the clock pulse generator in the programmable controller and provides clock pulses at a rate commensurate with the speed of the digital printer. As a result, instructions are read from the memory matrix one at a time, and at a rate determined by the speed of the printer. These instructions are decoded and applied directly to the digital printer without the necessity of expensive memory or decoder units.

Another object of the invention is to synchronize the read out of the programs stored in the memory matrix with the maximum speed of the digital printer. The clock pulse and command signal generated by the central controller are produced by a monoshot circuit. While visually recording, the digital printer generates a disabling signal to the input of the monoshot circuit. However, after each line is printed, the disabling signal changes logic state allowing the monoshot circuit to generate another clock pulse and print command signal. Consequently, as soon as one instruction is read, decoded and recorded, the next instruction is read from the memory matrix.

The foregoing and other objects and advantages of the invention will appear from the following description. In the description reference is made to the accompanying drawings, which form a part hereof, and in which there is shown by way of illustration and not of limitation a preferred embodiment. Such embodiment does not represent the full scope of the invention, but rather the invention may be employed in many different embodiments, and reference is made to the claims herein for interpreting the breadth of the invention.

BRIEF DESCRIPTION OF THE DRAWINGS

FIG. 3 is a schematic electrical diagram of the central controller which forms a part of the present invention.

DESCRIPTION OF THE PREFERRED EMBODIMENT

Figure 1:
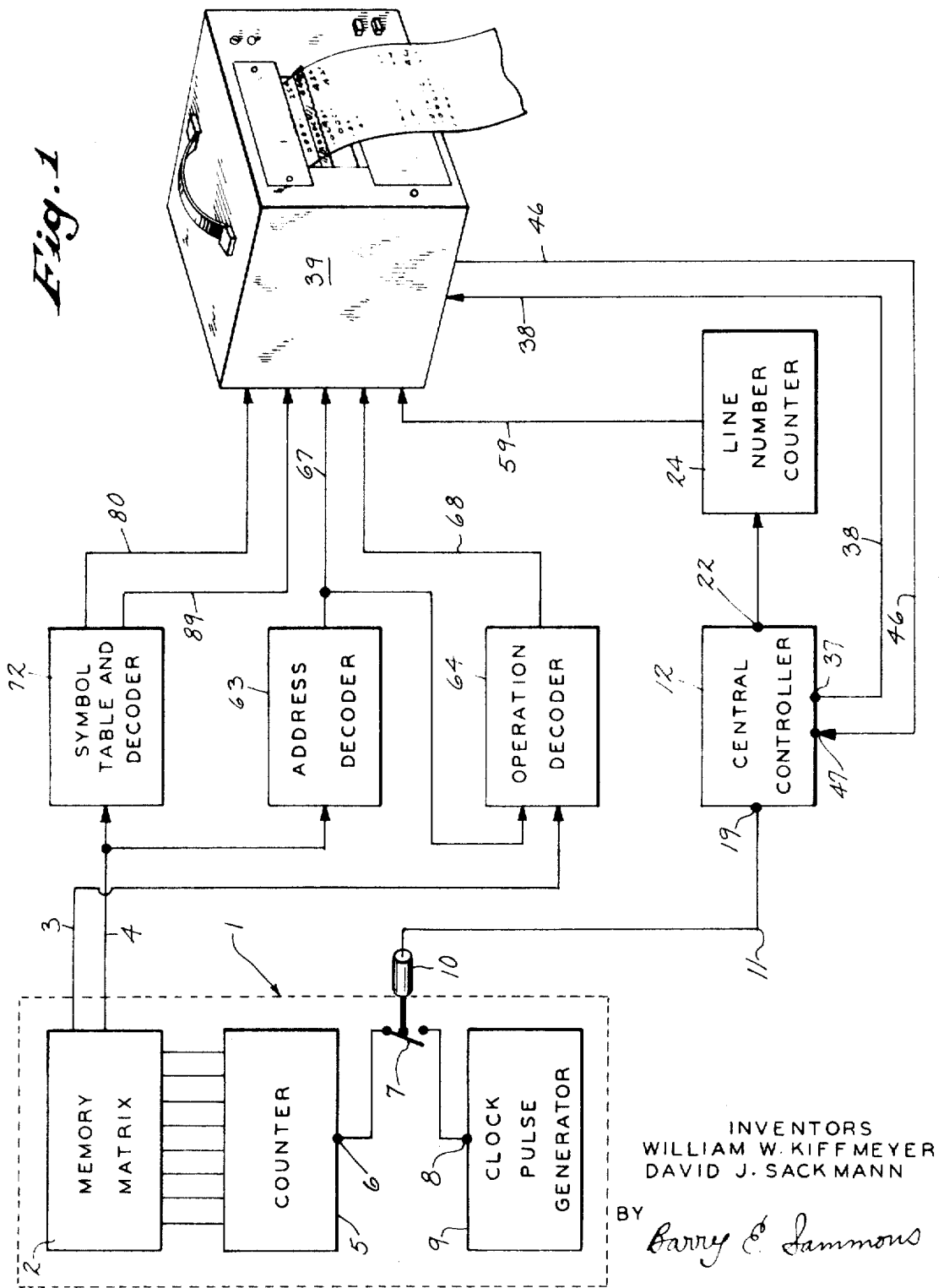
FIG. 1 is a block diagram of the invented printer and a portion of the programmable controller to which it is attached.

A portion of a programmable controller 1 is shown in FIG. 1 and includes a memory matrix 2 containing the program to be recorded. The program is stored as a sequence of instructions, each instruction, or binary word being eight bits in length and including a two-bit operation code and a six-bit address code. The operation code in each instruction defines the action to be taken by the digital controller, and the address identifies the particular input or output device that is to be acted upon.

The memory matrix 2 has a storage capacity for 192 eight-bit words and is formed by connecting together on a single card three 64-word read only diode memory matrices. The words or instructions are read out of memory one at a time and appear as a two-digit signal on an operator output bus 3 and a six-digit signal on an address output bus 4. Read out is accomplished by a counter 5 which is connected to the memory matrix 2. The counter generates a sequence of eight-bit digital signals to the memory matrix 2 which causes the instructions stored therein to be read out in sequence, one at a time, in synchronism with clock pulses applied to a counter input terminal 6. The counter input terminal 6 is connected through a normally closed switch 7 to the output terminal 8 of a clock pulse generator 9 which generates a continuous train of 100 kHz square waves when actuated. When operating in its standard mode, therefore, the programmable controller reads out one instruction stored in its memory matrix 2 every 10 microseconds, and it reads out its entire 192 instruction capacity in less than 2 milliseconds.

A commercially available digital printer 39 is used to record the stored program, and a digital printer such as that sold under the trade name "Anadex" disclosed in a publication entitled "Instruction Manual-Digital Printer Model DP-650" available from Anadex Instruments, Inc. of Van Nuys, California, is suitable for this purpose. Regardless of the type of digital printer selected, there is none which can record at the 10 microsecond rate of the programmable controller clock pulse generator 9, and as a consequence, it is a feature of this invention that the clock pulse generator is disabled during recording and the program is read out of the memory matrix 2 in synchronism with clock pulses generated by the printer circuitry.

The normal operating mode of the programmable controller is interrupted when the printer is attached to record the program stored in the memory matrix 2. This is accomplished by a plug 10 which is inserted to open the normally closed switch 7. The plug 10 is connected by means of a lead 11 to a central controller circuit 12 in the printer, and its insertion in the programmable controller electrically disables the clock pulse generator 9 and connects the lead 11 to the input terminal 6 of the counter 5.

Referring to FIG. 3, the central controller 12 includes a monoshot circuit 13 which is a standard commercial circuit available in integrated circuit form. It generates a voltage pulse of fixed duration (1 millisecond in the preferred structure) when a positive voltage step or transition is applied to an input terminal 14. The monoshot 13 generates a positive going voltage pulse of one millisecond duration at a Q output terminal 15 and a negative going one millisecond voltage pulse at a Q output terminal 16. The Q output terminal 16 connects to the input terminal 17 of a first inverter 18 which has an output terminal 19 connected through the lead 11 and plug 10 to the controller 1. The Q output terminal 15 connects to an input terminal 20 of a second inverter circuit 21. As shown in FIG. 1, an output terminal 22 on the second inverter 21 connects through a lead 23 to a line number counter circuit 24.

Referring again to FIG. 3, the Q output terminal 16 of the monoshot circuit 13 also connects to a first input terminal 25 of a NAND gate 26. A second input terminal 27 on the NAND gate 26 connects through a mode switch 28 to circuit ground. The NAND gate 26 is a commercially available logic gate of the current sinking type, having an output terminal 29 which assumes a logic low state when its input terminals 25 and 27 are driven high. The NAND gate output 29 is connected to a clock terminal 30 on a J-K flip-flop 31. The J-K flip-flop 31 is also a standard commercially available circuit of the current sinking type which is bistable in either a reset or set state. When reset, a Q terminal 32 is high, and when set by the trailing edge of a positive voltage pulse applied to the clock terminal 30, the Q terminal 32 goes low. A J terminal 33 on the J-K flip-flop 31 is connected to a positive 15-volt power supply, and a K terminal 34 is connected to the circuit ground. The Q terminal 32 of the J-K flip-flop 31 connects to an input terminal 35 of a third inverter circuit 36. As shown in FIG. 1, an output terminal 37 on the third inverter 36 connects through a lead 38 to a digital printer 39.

Referring again to FIG. 3, a direct reset terminal 40 on the J-K flip-flop 31 connects to the input terminal 14 of the monoshot circuit 13, connects through a load resistor 41 to a positive 15-volt supply terminal, connects to an output terminal 42 on a buffer circuit 43, and connects through a diode 88 to a Q terminal 44 on a R-S flip-flop 45. The buffer circuit 43 provides impedance matching and noise immunity for a disabling signal which is received at an input terminal 47 through a lead 46 from the digital printer 39. The R-S flip-flop 45 is a commercially available circuit which is bistable in either a set or reset state. Its Q output terminal 44 is set in a logic high state when a logic low voltage is applied to an S terminal 48, and its Q terminal 44 is reset in a logic low state when a logic low voltage is applied to an R terminal 49. The R terminal 49 connects through a voltage drop resistor 50 to a positive 15-volt supply terminal and through a reset switch 51 to circuit ground. For the sake of clarity the reset switch 51 is shown schematically herein as a portion of the central controller 12. However, the reset switch 51 is actually located in the programmable controller and is automatically closed each time the entire program is read out of the memory matrix 2. The S terminal 48 of the R-S flip-flop 45 connects through a coupling diode 52 to an output terminal 53 of a fourth inverter circuit 54. Similarly, the output terminal 29 of the NAND gate 26 connects through a second coupling diode 55 to a fourth inverter output terminal 53. An input terminal 56 on the fourth inverter 54 connects through a coupling resistor 57 to circuit ground and through a normally open start switch 58 to a positive 15-volt supply terminal.

The central controller 12 operates in either an automatic mode to read the entire program out of the memory matrix 2, or in a manual mode to read one instruction at a time out of the memory matrix 2. When operated in the automatic mode, the mode switch 28 is open as shown in FIG. 3. The operation is initiated by closing the start switch 58 which causes a logic high to be applied to the input terminal 56 of the fourth inverter circuit 54. The resulting logic low at the inverter output terminal 53 is applied through the coupling diode 52 to set the R-S flip-flop 45. The Q terminal 44, therefore, assumes a logic high state and the input terminal 14 of the monoshot circuit 13 is released to go high. As a consequence, a positive going voltage pulse is generated at the Q terminal 15 and a negative going voltage pulse is generated at the Q terminal 16 of the monoshot circuit 13. The negative voltage pulse is inverted by the first inverter 18 to form a clock pulse, the leading edge of which advances the counter 5 in the controller 1 to read the first instruction stored in the memory matrix 2. The same negative going voltage pulse is also applied to the input terminal 25 of the NAND gate 26, causing a positive voltage pulse to be generated to the clock terminal 30 of the J-K flip-flop 31. The trailing edge of this pulse sets the J-K flip-flop 31 causing its Q terminal 32 to go low. This logic low is inverted by the third inverter circuit 36 to form a logic high print command signal which is generated to the digital printer 39 through the lead 38. The print command signal actuates, a flip-flop (not shown in the drawings) in the digital printer 39 which generates a logic low disabling signal through the lead 46 to the buffer circuit 43. As a result, the monoshot circuit 13 is reset and disabled after the generation of a single pulse by the application of a logic low voltage to its input terminal 14, and the J-K flip-flop 31 is reset through the direct reset terminal 40. As used herein, the primary purpose of the J-K flip-flop 31 is to delay the generation of a print command signal by one millisecond. To accomplish this it is clocked by the trailing edge of the pulse generated by the monoshot circuit 13.

When the first instruction of the program stored in the memory matrix 2 has been recorded by the digital printer 39, the logic low disabling signal applied to the buffer circuit 43 terminates and its output terminal 42 steps to a logic high voltage. As a result, the monoshot circuit 13 is actuated through its input terminal 14 to generate another clock pulse. The sequence repeats for each instruction of the program, and after the final instruction, the reset switch 51 is closed by the programmable controller and as a result the R-S flip-flop 45 is reset. The Q terminal 44 is thus driven to a logic low voltage which is applied to the input terminal 14 of the monoshot circuit 13 to disable it until the start switch 58 is again closed.

When operated manually, the mode switch 28 is closed and the start switch 48 is depressed to read an instruction stored in a memory matrix 2. With the mode switch 28 closed, the output terminal 29 of the NAND gate 26 is driven to a logic high voltage and remains such despite the voltage applied to its other input terminal 25. When the start switch 58 is closed, the output terminal 53 of the fourth inverter 54 goes low and acts through the first coupling diode 52 to set the R-S flip-flop 45. As a result a positive voltage step is applied to the input terminal 14 of the monoshot circuit 13 causing a clock pulse to be generated through the lead 11 to the programmable controller 1 and through the lead 23 to the line number counter 24. When the start switch 58 is again depressed, the J-K flip-flop 31 is clocked through the second coupling diode 55 and a print command signal is generated through the lead 38 to operate the digital printer 39 and record the first instruction. A disabling signal applied through the lead 46 holds the input terminal 14 of the monoshot circuit 13 at a logic low voltage until printing is completed. When the disabling signal terminates the monoshot circuit 13 generates another clock pulse which advances the counter 5 to read the second instruction of the program from the memory matrix 2. Recording of this second instruction occurs when the start switch 58 is again closed, thus the rate of operation is governed manually.

It should be apparent to those skilled in the art that variations can be made in the central controller 12. The inverters 18, 21 and 36 serve primarily as buffers and by switching their connections to the monoshot circuit 13 and J-K flip-flop 31, non-inverting buffers can be substituted. Also, delay means other than the J-K flip-flop 31 can be used.

Figure 2:
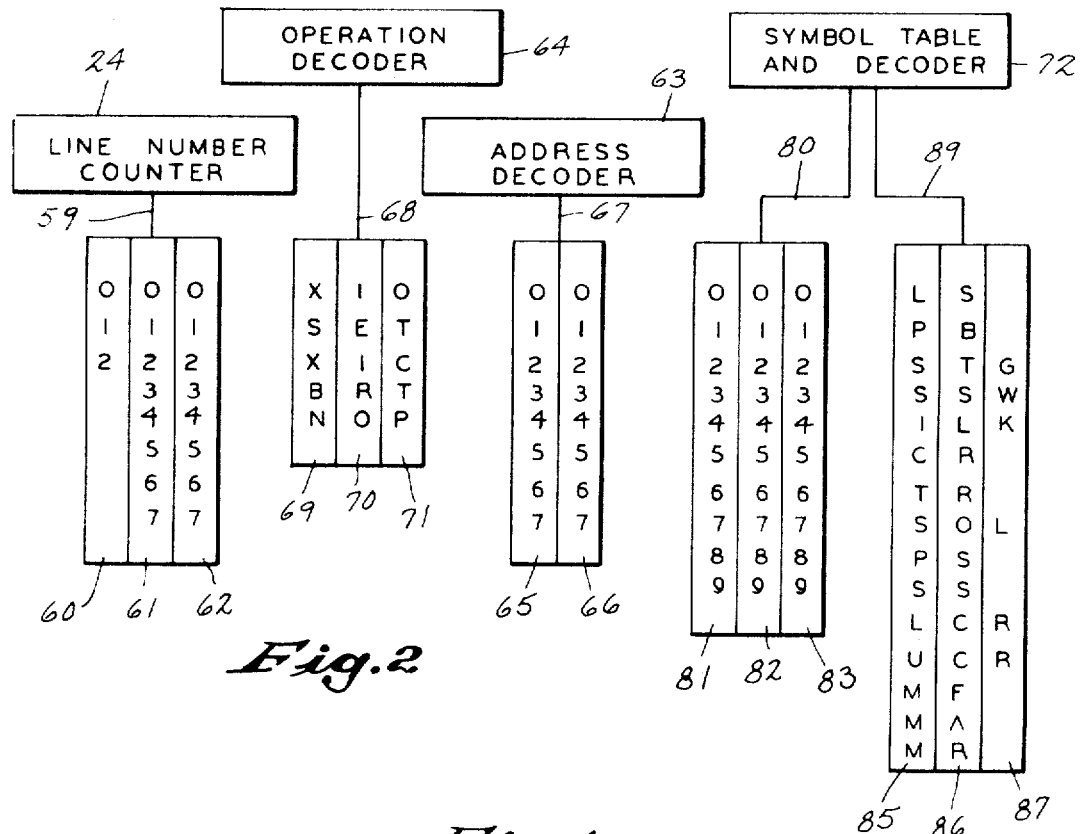
FIG. 2 is a schematic representation of a portion of the digital printer which forms a part of the present invention.

Referring to FIG. 1, the line number counter 24 receives clock pulses from the central controller 12 through the lead 23 in synchronism with the clock pulses generated to the counter 5 in the programmable controller 1. The line number counter 24 is a standard counter circuit having an eight-bit capacity. Its output is continuously generated through the counter bus 59 to the digital printer 39 and it contains in coded binary form the total number of clock pulses generated by the central controller 12. As shown in FIG. 2, the eight-bit binary coded signal on the counter bus 59 is connected to select symbols in the first three columns 60, 61 and 62 of the printing drum on the digital printer 39. Since the instructions stored in the memory matrix 2 are read out in order, the signal from the line number counter 24 indicates which of the three PROMs in the memory matrix 2 and what line in that PROM is being read and recorded. The symbol selected from the first column 60 indicates the PROM number, and the symbols selected from the second and third columns 61 and 62 indicate the line number (octal) in that PROM.

Referring to FIGS. 1 and 2, the printer also includes an address decoder 63 and an operation decoder 64, both connected to the memory matrix 2 in the programmable controller 1. The address decoder 63 is connected to the address output bus 4 to receive each six-bit address pole read from the memory matrix 2 and connected to the digital printer 39 through an address bus 67 to select one of eight symbols in a seventh column 65 and one of eight symbols in an eighth column 66. The address decoder 63 is a standard circuit which is available in integrated circuit form. It operates to decode the address code in each instruction read from the memory matrix 2 and select a pair of corresponding symbols from the columns 65 and 66 representing an octal number between 0 and 77.

The operation decoder 64 is also a standard decoding circuit. It is connected to the operator output bus 3 to receive the two-bit operation code contained in each instruction read from the memory matrix 2. An operation bus 68 connects the output of the operation decoder 64 to the digital printer 39. The operation decoder 64 is connected and operates to select one of four sets of symbols (XIO, SET, XIC and BRT) in response to the received operation code. Additionally, it is connected to the address bus 67 to receive a signal when either of the addresses 00 or 77 is read from the memory matrix 2, and in response thereto, select a fifth set of symbols (NOP). As shown in FIG. 2, each of the five sets of symbols selectable by the operation decoder 64 occupies a line extending through three columns 69, 70 and 71 on the printing drum of the digital printer 39. The digital printer 39 is wired such that selection of a symbol in one of these three columns selects symbols on the same line in the remaining two columns.

The operation of the printer circuit described thus far can be summarized as follows. The clock pulse generator 9 in the programmable controller 1 is disabled and the central controller 12 is connected to the programmable controller counter 5 by insertion of the plug 10. When operated in the automatic mode, the central controller first generates a clock pulse through the lead 11 to the counter 5 and through the lead 23 to the line number counter 24. As a result, the first instruction is read out of the memory matrix 2 and is decoded by the address decoder 63 and operation decoder 64 to select symbols in columns 69, 70 and 71 and columns 65 and 66 on the printing drum of the digital printer 39. Simultaneously, the line number counter 24 operates to select symbols in the columns 60, 61 and 62 of the digital printer. Roughly one millisecond later the central controller 12 generates a print command signal through the lead 38 to operate the digital printer 39, causing the selected symbols to be recorded on paper. During the actual recording, or printing operation, the generation of another clock pulse is inhibited by a disabling signal generated by the digital printer 39 to the central controller 12. After the first instruction is recorded, the disabling signal terminates and another clock pulse is generated to read and record the second instruction in the stored program. The cycle repeats until the entire program is printed out.

Another feature of the present invention is embodied in a symbol table and decoder circuit 72 which is attached to the address output bus 4 on the memory matrix 2. As mentioned above, the address code in each instruction represents a particular input or output device attached to the programmable controller. Such devices are usually designated on schematic diagrams and the like by means of numbers and symbols which are familiar to control engineers. Consequently, when visually recording the stored program it is desirable to record or print out the number and symbol corresponding to each address code read from the memory matrix 2. This is accomplished by the symbol table and decoder circuit 72.

Figure 4:
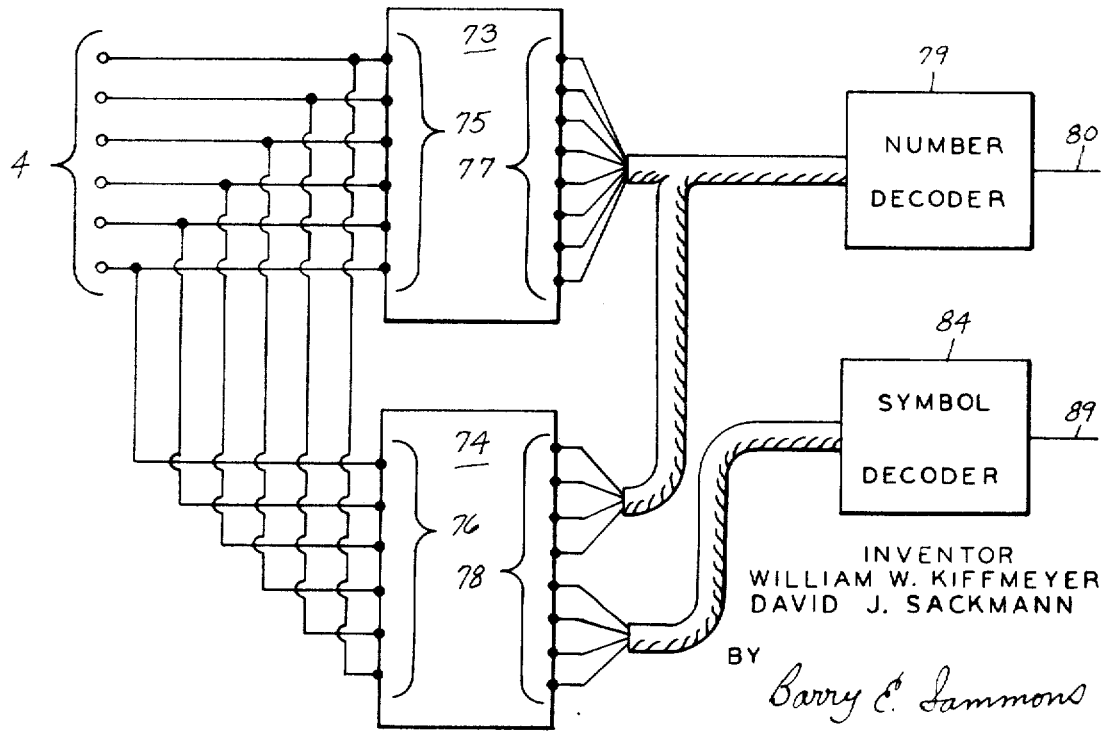
FIG. 4 is an electrical schematic diagram of the symbol table and decoder which forms a part of the present invention.

Referring to FIG. 4, the symbol table and decoder circuit 72 includes a pair of eight-bit, sixty-four word, diode read only memory matrices 73 and 74 similar to those used in the controller memory matrix 2. Instead of being attached to a counter, however, the six input terminals 75 on the first diode matrix 73 and the six input terminals 76 on the second diode matrix 74 are connected to the address output bus 4. Thus, each time an instruction is read from the controller memory matrix 2, a six-bit digital signal corresponding to the addressed input or output device is received by the diode matrices 73 and 74. These digital signals cause a corresponding line in each diode matrix 73 and 74 to be read out at the respective output terminals 77 and 78.

By selectively "burning" or "fusing" the diode matrices 73 and 74, the eight-bit digital signals generated at their output terminals 77 and 78 can be decoded and used to select symbols on the printing drum of the digital printer 39. More specifically, the eight outputs 77 of the first diode matrix 73 are combined with four of the outputs 78 of the second diode matrix 74 to generate a 12-bit signal to a number decoder 79. The number decoder 79 is connected to the digital printer 39 by means of a number bus 80. It is a standard, commercially available circuit which decodes the 12-bit input signal and selects one symbol in each of three columns 81, 82 and 83 on the printing drum of the digital printer 39. Thus, for example, when an instruction containing the address code 15 (octal) is read from the memory matrix 2, the resulting digital signal on the address output bus (001 101) causes a line in the diode matrices 73 and 74 to be read out to the number decoder 79. If the device which has been assigned the address 15 (octal) is, for example, a solenoid designated by the number 158, the line read from the diode matrices 73 and 74 is "burned" or "fused" so that the binary number (0001 0101 1000) is generated to the number decoder 79. This binary number is decoded and the decimal number 158 is selected and is visually recorded by columns 81, 82 and 83 of the digital printer 39.

The remaining four bits of each line read from the diode matrix 74 are generated to a symbol decoder 84. The symbol decoder 84 is a commercially available circuit which decodes the four-bit binary coded signal and operates through the symbol bus 89 to select one of the fifteen sets of symbols contained in columns 85, 86 and 87 of the digital printer 39. As with columns 69, 70 and 71, columns 85, 86 and 87 are wired together to receive a digital signal, select and print a set of symbols on the same line. For example, when the address code 15 (octal) in the above example is read out of the memory matrix 2, a four-bit digital signal (0111) is generated to the symbol decoder 84 by appropriately "burning" or "fusing" the second diode matrix 74. This signal is decoded and the symbol SOL is selected for recording by the digital printer 39. Although diode matrices are used in the symbol table and decoder circuit described herein, it is contemplated that other types of read-only memories may be substituted. Therefore, although the terms "burning" or "fusing" used herein relate to the use of diode matrices, it is contemplated that these terms encompass any means of programming the read-only memories used, regardless of their type.

We claim:

1. A printer connectable to a programmable controller having a memory matrix containing a program stored as a series of one-word instructions which are read out one at a time in response to clock pulses produced by a clock pulse generator, the combination comprising:

a digital printer which visually records a line containing a plurality of selected symbols when a print command signal is received;

decoder means connected to the memory matrix of the programmable controller to receive each instruction read from said memory matrix and connected to said digital printer to select symbols corresponding to the received instruction;

switch means for disconnecting said clock pulse generator from said memory matrix; and a central controller connected to said digital printer and connected to said programmable controller, said central controller including first means which generates a clock pulse to said programmable controller causing an instruction to be read out of said memory matrix, and second means which generates a print command signal to said signal printer causing the instruction read from the memory matrix to be visually recorded.

2. The combination, as recited in claim 1 wherein said first means includes a monoshot circuit which generates a clock pulse to said programmable controller, and said second means includes delay means which is connected to receive the clock pulse generated by said monoshot circuit and which is connected to generate a print command signal to said digital printer a predetermined time interval after reception of each clock pulse.

3. The combination, as recited in claim 2, which includes a line number counter connected to receive the clock pulses generated by said monoshot circuit and connected to the digital printer to select from a first set of symbols, said line number counter being operable to count the number of clock pulses generated by the monoshot circuit while a program is being read out of the memory matrix and to select symbols indicating this count.

4. The combination, as recited in claim 1 which includes a symbol table and decoder circuit connected to the memory matrix of the programmable controller to receive an address code in each instruction read from said memory matrix and connected to said digital printer to select from a second set of symbols, wherein said symbol table and decoder circuit includes a read-only memory which generates a distinct preset digital signal to the digital printer for each address code received from said memory matrix whereby a distinct set of symbols is selected for recording by each of these preset digital signals.

* * * * *

UNITED STATES PATENT OFFICE
CERTIFICATE OF CORRECTION

Patent No. 3,753,246   Dated August 14, 1973

Inventor(s) William W. Kiffmeyer and David J. Sackmann

It is certified that error appears in the above-identified patent and that said Letters Patent are hereby corrected as shown below:

| | |
|---|---|
| Column 3, line 48 | change "Q" both occurrences, to – $\bar{Q}$ – |
| Column 3, line 56 | change "Q" to – $\bar{Q}$ – |
| Column 4, line 1 | change "Q" to – $\bar{Q}$ – |
| Column 4, line 3 | change "Q" to – $\bar{Q}$ – |
| Column 4, line 6 | change "Q" to – $\bar{Q}$ – |
| Column 4, line 38 | change "a" second occurrence, to – the – |
| Column 4, line 58 | change "Q" to – $\bar{Q}$ – |
| Column 4, line 67 | change "Q" to – $\bar{Q}$ – |
| Column 5, line 5 | after "ates" delete – , – |
| Column 6, line 24 | change "pole" to – code – |
| Claim 1, line 48 | change "signal" second occurrence, to – digital – |

Signed and sealed this 8th day of January 1974.

(SEAL)
Attest:

EDWARD M. FLETCHER, JR.
Attesting Officer

RENE D. TEGTMEYER
Acting Commissioner of Patents